Figure 1:
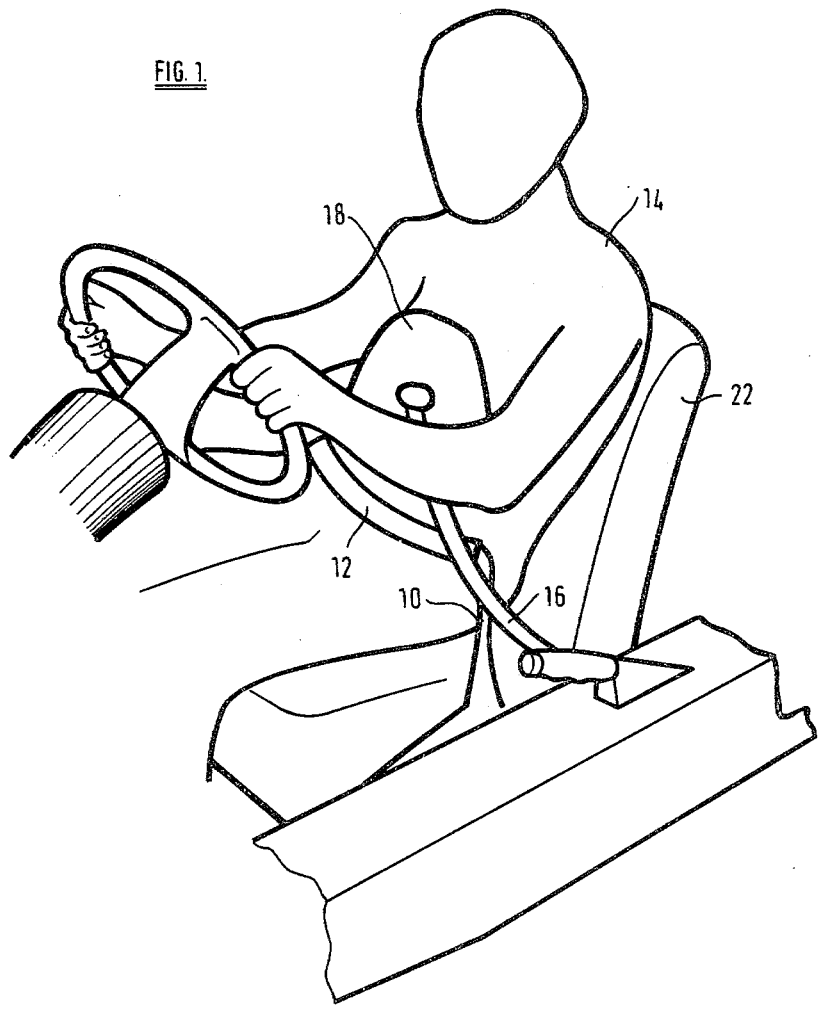

United States Patent [19]

Cunningham

[11] 4,300,799
[45] Nov. 17, 1981

[54] VEHICLE OCCUPANT RESTRAINT SYSTEM
[75] Inventor: Douglas J. Cunningham, Lutterworth, England
[73] Assignee: B.S.G. International Limited, Birmingham, England
[21] Appl. No.: 125,907
[22] Filed: Feb. 29, 1980
[30] Foreign Application Priority Data
Mar. 3, 1979 [GB] United Kingdom ............... 07570/79
[51] Int. Cl.³ ............................................. B60R 21/00
[52] U.S. Cl. ................................. 297/487; 74/522; 297/464; 297/475
[58] Field of Search ............... 297/216, 486, 487, 464, 297/468, 475, 476; 74/522, 119

[56] References Cited

U.S. PATENT DOCUMENTS

| | | | |
|---|---|---|---|
| 586,563 | 7/1897 | Parsons | 74/522 |
| 2,087,885 | 7/1937 | Fleischel | 74/522 |
| 3,262,716 | 7/1966 | Graham | 297/468 X |
| 3,471,197 | 10/1969 | Ely | 297/216 X |
| 3,901,550 | 8/1975 | Hamy | 297/486 |

FOREIGN PATENT DOCUMENTS

| | | |
|---|---|---|
| 1523812 | 3/1968 | France . |
| 2100051 | 3/1972 | France . |
| 2172702 | 9/1973 | France . |
| 2275341 | 1/1976 | France . |
| 2349343 | 11/1977 | France . |

*Primary Examiner*—James T. McCall
*Attorney, Agent, or Firm*—Kemon & Estabrook

[57] ABSTRACT

A system for restraining forward movement of an occupant of a motor vehicle seat comprises a chest pad 18 on an arm 16 which is pivotable about a transverse axis 20 behind and below the seat, together with a lap restraint in the form of an arm 10 having a padded portion 12 which extends across the user's lap. The arm 10 is pivotally mounted on a transverse axis 24 located near the front of the seat. A lever 26 is fast with the arm 16 and a lever 28 is fast with the arm 10. A roller 32 engages confronting surfaces 34 and 36 on the arms 26 and 28. When the roller 32 is in the position shown, forward movement of the arm 16 causes relatively little backward movement of the arm 10 so that the occupant can lean forward in his seat without forcing the bar on the arm 10 into his lap. If, due to sudden decceleration of the vehicle, the occupant moves forward in his seat, lifting the padded portion 12, the roller 32 shoots forwards into engagement with stop surface 38. The velocity ratio of the coupling between the arms 10 and 16 has now changed so that subsequent forward movement of the padded portion 12 is approximately equal to the resulting backward movement of the lap restraint means on the arm 10 and the occupant is held in his seat.

8 Claims, 8 Drawing Figures

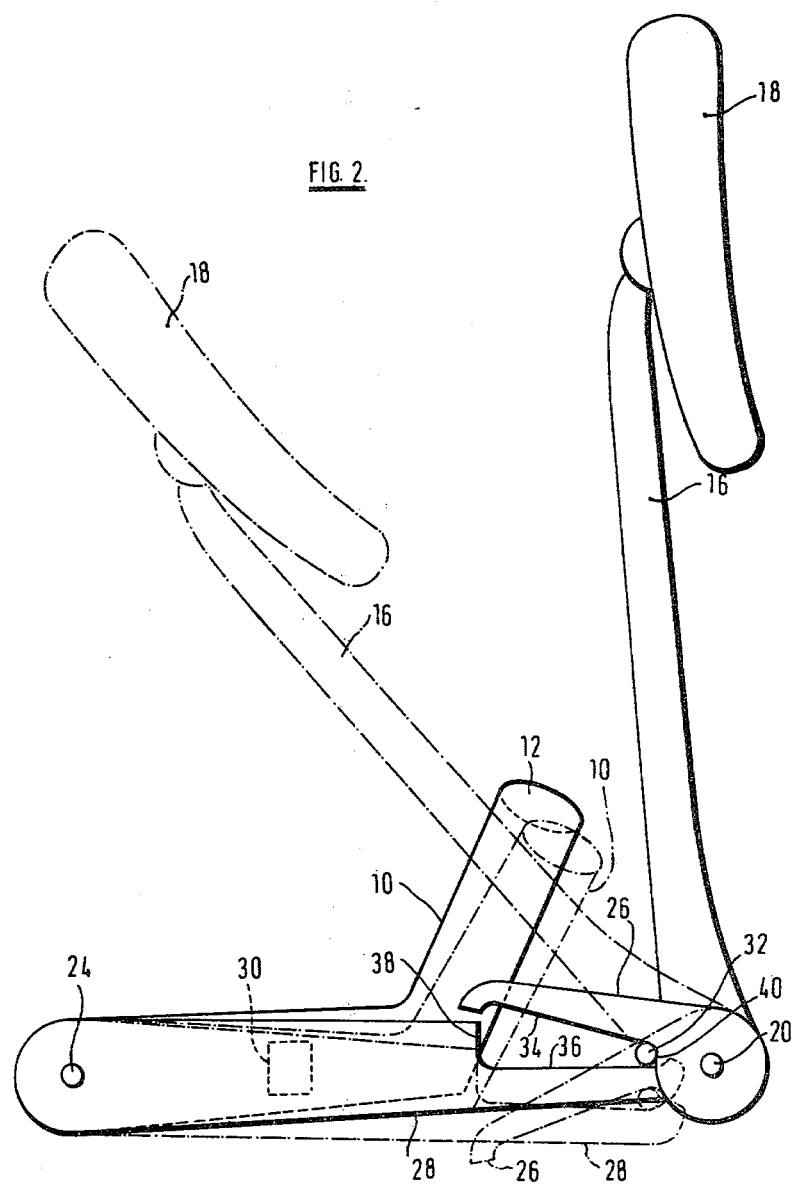

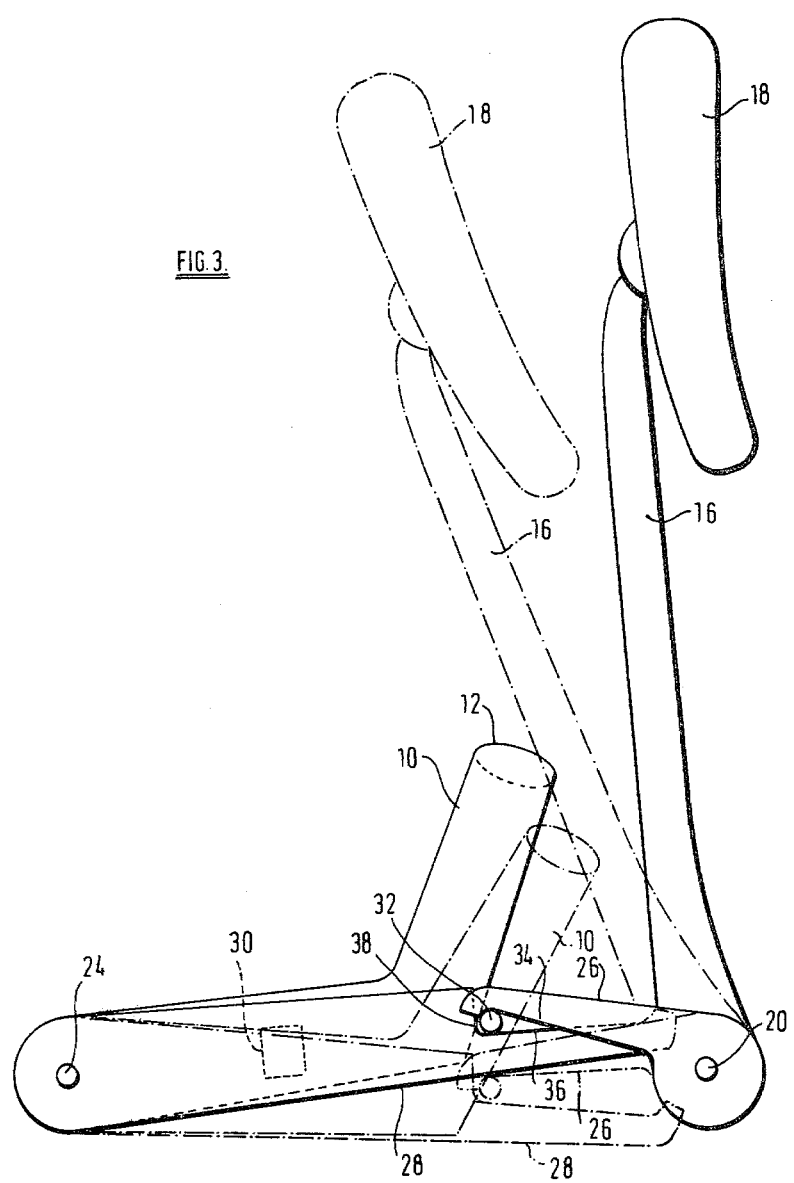

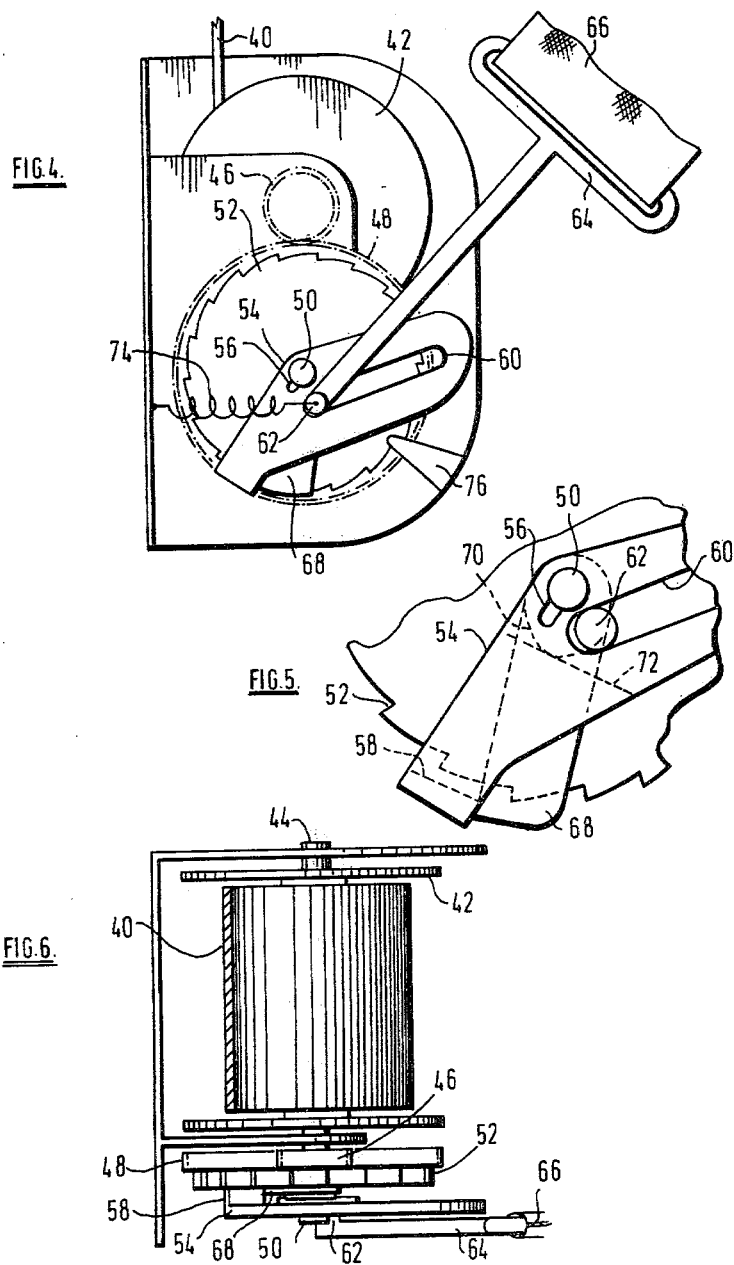

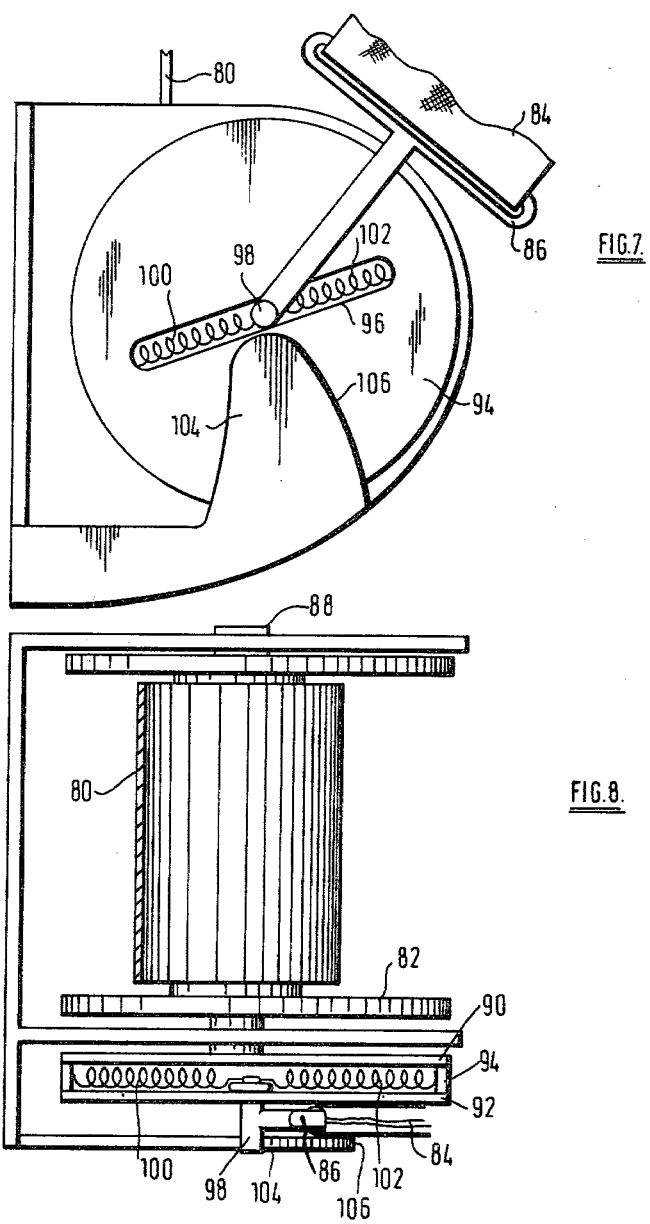

VEHICLE OCCUPANT RESTRAINT SYSTEM

This invention relates to systems for restraining forward movement, relative to a motor vehicle, of an occupant of the vehicle during sudden deceleration thereof. The invention is also concerned with variable velocity ratio coupling means primarily for the foregoing purpose but capable of general application.

At present, safety belts fitted with inertia reels are used to permit a vehicle occupant to lean forwards, while wearing a safety belt, when the vehicle is travelling normally, but to restrain such forward movement when the vehicle is subject to sudden deceleration. The present invention is concerned with the provision of a safety system which provides this facility without using an inertia locking mechanism.

According to the invention in one aspect, a system for restraining forward movement of an occupant of a motor vehicle seat comprises chest restraint means adapted to engage with the occupant's chest, lap restraint means adapted to engage with the occupant's lap and coupling means interconnecting the chest restraint and the lap restraint means so that, in use, forward movement of the lap restraint means causes backward movement of the chest restraint means, the coupling means including variable velocity ratio means arranged to vary the velocity ratio of the coupling means in response to forward movement of the lap restraint means to increase the extent of backward movement of the lap restraint means caused by a predetermined extent of forward movement of the chest restraint means.

It should be understood that the terms "forward movement" and "backward movement" are used herein to mean movement relative to the vehicle.

In one form of the invention, the coupling means includes a first lever connected to the chest restraint means and mounted for angular movement about a first axis and a second lever connected to the lap restraint means and mounted for angular movement about a second axis disposed parallel to but forwardly of the first axis, and the variable velocity ratio means comprises a roller arranged to engage between respective mutually confronting surfaces of the two levers and to be displaceable from a first position to a second position nearer to the second axis and further from the first axis than the first position. It is necessary to provide means for releasing the coupling means, for example by disconnecting one of the levers from its corresponding restraint means, to enable the occupant to enter and leave his seat.

In another form of the invention, the lap and chest restraint means comprise the lap and shoulder elements of a three-point safety belt and the coupling means comprises a reel on which the shoulder element is wound, rotation of the reel in the unwinding direction being opposed by tension in the lap element. The variable velocity ratio means may comprise means for varying the radius at which the force exerted by such tension is applied to the reel to engage with the chest of the user 14. As can be seen in FIG. 2, the arm 16 is pivotally mounted on a shaft 20 located means to zero so that forward movement of the chest restraint means can take place without any movement of the lap restraint means.

According to the invention in another aspect, variable velocity ratio coupling means comprises two levers mounted for angular movement about respective mutually parallel axes and having mutually confronting surfaces arranged to engage with opposite sides of a coupling element located between the two axes, whereby displacement of the coupling element along the surfaces towards one of the axes reduces the effective length of the corresponding lever and increases the effective length of the other lever, thereby changing the velocity ratio between the angular movements of the two levers.

The coupling element may take the form of a roller.

Embodiments of the invention will now be described, by way of example, with reference to the accompanying drawings, in which:

FIG. 1 is a perspective view of a restraint system in accordance with the invention, FIGS. 2 and 3 are side views showing the mechanism of the embodiment illustrated in FIG. 1 in alternative positions, FIG. 4 is a side view of a reel for a restraint system in accordance with another embodiment of the invention, FIG. 5 shows part of the mechanism of FIG. 4 on an enlarged scale, FIG. 6 is a plan view of the reel shown in FIG. 5, FIG. 7 is a side view of a reel for a restraint system in accordance with a further embodiment of the invention, and FIG. 8 is a plan view of the reel shown in FIG. 7.

The restraint system shown in FIGS. 1 and 2 comprises a cranked lap restraint arm 10, having a padded portion 12, to engage with the lap of a user, shown in outline at 14, and a chest restraint arm 16, the outer end of which carries a pad 18 to engage with the chest of the user 14. As can be seen in FIG. 2, the arm 16 is pivotally mounted on a shaft 20 located adjacent to the bottom of the back of the user's seat 22 (FIG. 1) while the arm 10 is mounted on a second shaft 24 adjacent to the front of the seat 22. If desired, the shafts 20 and 24 form part of the structure of the seat 22. It is, in any case, necessary for the shafts 20 and 24 to move with the seat 22 as its position is adjusted.

A lever 26 is mounted on the shaft 20, fast with the arm 16. A second lever 28 is mounted on the shaft 24, and is detachably coupled to the arm 10 by a releasable latch 30 (not shown in detail). A roller 32 engages between confronting surfaces 34 and 36 formed on the levers 26 and 28 respectively. The roller 32, which can slide along the surfaces 34 and 36 between stops formed by abutments 38 and 40, is spring biased into engagement with the abutment 40 at the end nearer to the shaft 20. The roller 32 is weighted to increase its mass, thereby to increase the tendency for it to slide forwards into engagement with the other abutment during sudden deceleration of the vehicle into which it is fitted, as will be explained hereinafter.

When the seat 22 is unoccupied, the latch 30 is released and the arms 10 and 16 are pushed as far forwards as the surrounding parts of the vehicle, for example the steering wheel, will allow. When the user 14 is seated, he pulls the arms 10 and 16 towards him so as to bring the pad 18 and the padded portion 12 of the arm 10 into engagement with his body. The latch 30 is then engaged, the arms 10 and 16 and levers 26 and 28 being in the positions shown in solid lines in FIG. 2.

If the user now leans forward, for example to reach something beyond the steering wheel, the arm 16 moves towards the position shown in chain-dotted lines in FIG. 2. The resulting movement of the lever 26 causes the roller 32 to press down on the lever 28 but, because the roller 32 is close to the shaft 20, the resulting angular movement of the lever 28 and the arm 10 is small enough to cause the user no discomfort as the padded portion 12 moves towards his lap.

Turning now to FIG. 3, if the vehicle is subject to sudden deceleration, for example due to a crash, the combined effect of the inertia of the weighted roller 32 and the squeeze imposed thereon by the surfaces 34 and 36 resulting from the simultaneous application of thrust to the arms 10 and 16 due to the inertia of the user's body, is to displace the roller 32 into contact with the abutment 38. The result of this movement of the roller 32 away from the shaft 20 and closer to the shaft 24 is to bring the velocity ratio of the coupling between the two arms 10 and 16 closer to unity, so that movement of the arm 16 to the position shown in chain-dotted lines in FIG. 3 causes movement of the arm 10 through a comparable distance, to its position shown in chain dotted lines. Thus the force exerted by the user's body on the chest restraint arm 16 balances that exerted on the lap restraint arm 10.

FIGS. 4, 5 and 6 show a reel suitable for use as the coupling means of a restraint system where the chest and lap restraint means take the form of a three-point safety belt. The end of the shoulder element 40 on the belt, which forms the chest restraint means, is wound on to a reel 42, the wind-on direction being the clockwise direction as viewed in FIG. 4. The reel 42 is mounted on a shaft 44 and is fast with a gear wheel 46 which meshes with a larger gear wheel 48 of e.g. four times the diameter of the wheel 46. The gear wheel 48 is mounted on a shaft 50 and is fast with a ratchet wheel 52.

A two-armed lever 54 is also mounted on the shaft 50 by means of an elongate hole 56. One arm of the lever carries a protuberance 58 (FIG. 5) which serves as a pawl for engagement with the ratchet wheel 52, the elongate hole 56 allowing it to move into and out of engagement. The other arm of the lever 54 contains a slot 60 in which is slidably mounted a stud 62 connected to a stirrup 64 for attachment to the end of the lap element 66 of the safety belt.

Also mounted on the shaft 50, between the ratchet wheel 52 and the lever 54, is a hold-off plate 68 which is in light frictional engagement with the adjacent face of the ratchet wheel 52. The hold off plate 68 carries a cam 70 which engages with a follower surface 72 projecting from the lever 54 so that, when the lever 54 and the hold-off plate 68 are in the relative positions shown in FIG. 5, with the edge of the hold-off plate 68 abutting against the protuberance 58, the latter is held out of engagement with the ratchet wheel 52 but, when the lever 54 moves in the clockwise direction (as viewed in FIG. 5) relative to the hold-off plate 68, the protuberance 58 is allowed to move into engagement with the ratchet wheel 52. A tension spring 74, connected to the stud 62 serves both to cause such clockwise movement and bias the stud 62 to the inner end of the slot 60. A stop 76 limits movement of the hold-off plate in the anticlockwise direction.

When the belt is being put on, the shoulder element 40 is drawn off the reel 42 and initially, the lap element 66 is slack. Clockwise rotation of the reel 42, carrying the hold-off plate with it, causes the cam 70 thereof to lift the protuberance 58 on the lever 54 clear of the ratchet wheel 52. The reel 42 therefore remains free to rotate in both directions even if tension is subsequently applied to the lap element 66, for example just prior to engagement of the buckle (not shown). Inevitably, an excess length of the shoulder element 40 will be drawn off the reel and, as this is wound back, the hold-off plate 68 is carried in the anti-clockwise direction while the spring 74 holds the lever 54 stationary, freeing the protuberance 58 to move into engagement with the ratchet wheel 52. As the belt is adjusted at the buckle to equalize the tension in the two elements thereof, the resultant of the forces imposed on the stud 62 by the stirrup 64 and the spring 74 lifts the lever 54 to bring the protuberance 58 into engagement with the ratchet wheel.

In normal use, as the user leans forward and back again, the shoulder element 40 winds on and off the reel 42. Due to the ratio of the gear wheels 46 and 48, this causes a relatively small angular movement of the ratchet wheel 52 and, because the stud 62 is relatively close to the shaft 50, the result is a relatively small movement of the lap element 66. On the other hand, during sudden deceleration, for example due to a crash, the user's body applies force to both elements of the belt. The stud 62 is pulled to the outer end of the slot 60, against the action of the spring 74, from which position it can impose a larger couple on the lever 54 opposing unwinding of the reel 42. This, together with the effect of the ratio between the gears 46 and 48 and of the relatively small diameter of the portion of the belt remaining wound on the reel 42, enables the forces exerted on the mechanism by the two elements of the belt to balance each other, the precise relationship between these forces determining the angular position taken up by the lever 54.

When the belt is removed, the ratchet wheel 52 allows the reel 42 to wind up regardless of the position of the lever 54.

Another form of reel assembly for use in accordance with the invention is illustrated in FIGS. 7 and 8. As in the case of the reel assembly shown in FIGS. 4, 5 and 6, the free end of the diagonal part 80 of a three-point belt is wound on to a reel 82 and the free end of the lap part 84 is attached to a stirrup 86. However the reel 82 is directly mounted fast with a shaft 88 to which is secured a disc 90 which, in turn, is attached, at its periphery, to a second disc 92 by a plurality of studs 94. The disc 92 contains a slot 96 extending symmetrically across the centre thereof. A stud 98, to which the stirrup 86 is attached, is secured in the slot 96 and is biassed to a central position therein by springs 100 and 102. A guide member 104, having a camming surface 106, is disposed adjacent to the disc 92 so that, if the stud 98 is displaced slightly from the centre of the slot 96 when the reel 82 is rotating in the clockwise direction as viewed in FIG. 7, the stud 98 engages with the camming surface 106 and is displaced radially outwardly further along the slot 96.

In use, when insufficient tension is applied to the lap element 84 of the belt to displace the stud 98 to a radius at which it will engage with the camming surface 106, the reel 82 is free to rotate in both directions and the belt can be withdrawn therefrom both when putting the belt on and when the user leans forward in normal use. If tension is applied to both elements of the belt simultaneously, for example during a crash, the stud 98 moves radially outwardly along the slot 96 and the reel 82 takes up an orientation at which the couples exerted by the two elements 80 and 84 of the belt balance. The possibility of the reel 82 paying off a significant length of the element 80 of the belt before balance conditions are established is obviated by the camming surface 106.

The angle through which the reel 82 can rotate before it is in an orientation at which balance can be established may be reduced by providing one or more additional slots in the disc 92 similar to the slot 96 and symmetrically disposed with respect thereto about the centre of the disc 94. However, the provision of such additional slots leads to the risk of "tooth bounce" of the stud 98 on the ends of the lands between such slots keeping the stud 98 centralised while the reel 82 rotates at a rapid rate.

It should be realised that the foregoing embodiments of the invention have been illustrated schematically. In particular, no means is shown for countering the twisting forces exerted on the roller 32 of FIGS. 2 and 3 and the studs 62 and 98 of FIGS. 4 and 7 respectively. The design of suitable arrangements for this purpose will be obvious to one skilled in the art.

I claim:

1. A system for restraining forward movement of an occupant of a motor vehicle seat comprising chest restraint means adapted to engage with the occupant's chest, lap restraining means adapted to engage with the occupant's lap and and coupling means interconnecting the chest restraint means and the lap restraint means so that, in use, forward movement of the lap restraint means causes backward movement of the chest restraint means, the coupling means including variable velocity ratio means arranged to cause a non-linear variation in the velocity ratio of the coupling means in response to forward movement of the lap restraint means to increase the extent of backward movement of the lap restraint means caused by a predetermined extent of forward movement of the chest restraint means.

2. A system according to claim 1, wherein the coupling means includes a first lever connected to a chest restraint means and mounted for angular movement about a first axis and a second lever connected to the lap restraint means and mounted for angular movement about a second axis disposed parallel to but forwardly of the first axis, and the variable velocity ratio means comprises a roller arranged to engage between respective mutually confronting surfaces of the two levers and to be displaceable from a first position to a second position nearer to the second axis and further from the first axis than the first position.

3. A system according to claim 2, further comprising releasable connecting means for connecting one of the said first and second levers to its respective restraint means.

4. A system according to claim 2, wherein the chest restraint means comprises a pad mounted on an arm which is pivotable about the first axis.

5. A system according to claim 2, wherein the lap restraint means comprises an 'L' shaped arm having the end of one limb pivotable about the second axis and the other limb having a padded section for engagement with the occupant's lap.

6. A system according to claim 1, wherein the lap and chest restraint means comprise respectively the lap and shoulder elements of a three-point safety belt and the coupling means comprises a reel on which the shoulder element is wound, rotation of the reel in the unwinding direction being opposed by tension in the lap element.

7. A system according to claim 6, wherein the variable velocity ratio means comprises means for varying the radius at which the force exerted by such tension is applied to the reel.

8. A system according to claim 1, wherein the variable velocity ratio means is so arranged as to be capable of reducing the velocity ratio of the coupling means to zero so that forward movement of the chest restraint means can take place without any movement of the lap restraint means.

* * * * *